UNITED STATES PATENT OFFICE.

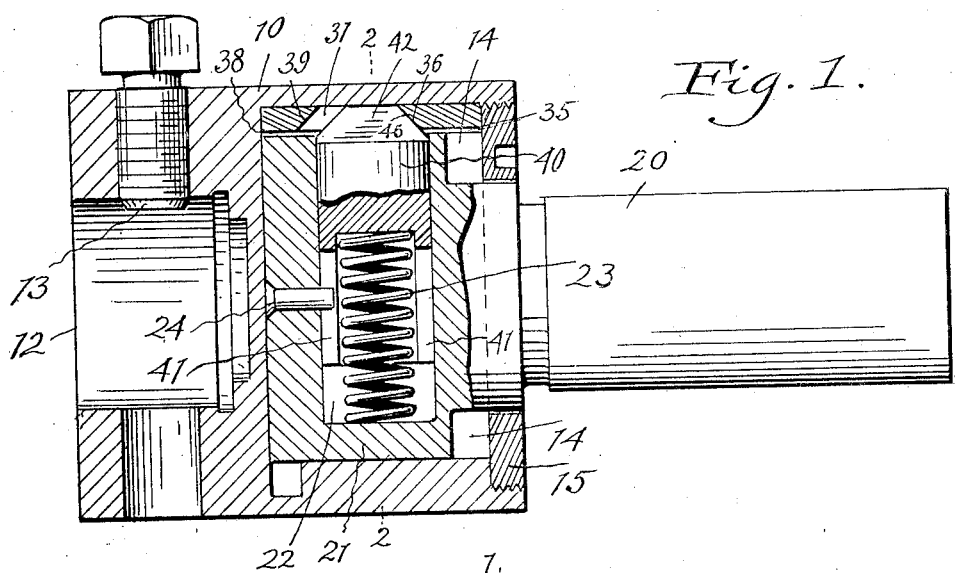
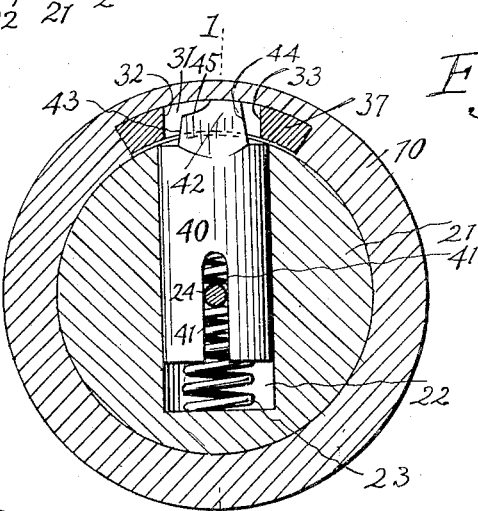
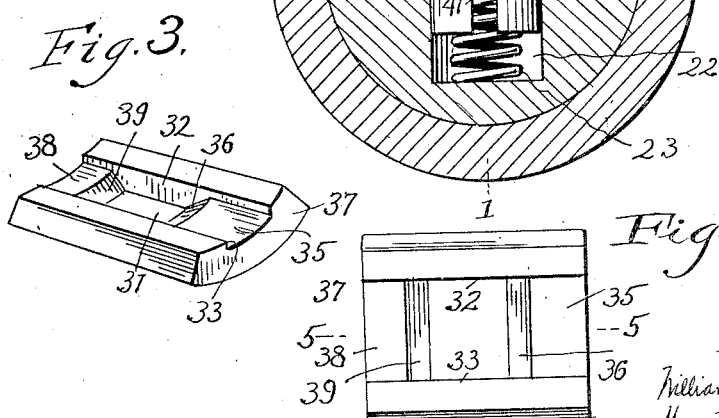
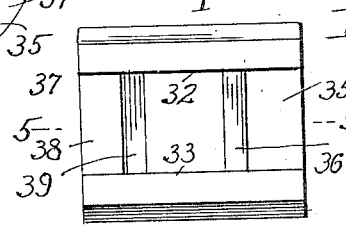
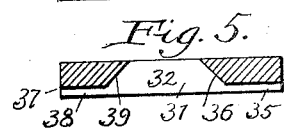

WILLIAM J. BURGER, OF EAST CLEVELAND, AND MAX E. LANGE, OF CLEVELAND, OHIO, ASSIGNORS TO THE WARNER & SWASEY COMPANY, OF CLEVELAND, OHIO, A CORPORATION OF OHIO.

TOOL OR WORK HOLDING DEVICE.

1,346,295.   Specification of Letters Patent.   Patented July 13, 1920.

Application filed October 27, 1919. Serial No. 333,584.

*To all whom it may concern:*

Be it known that we, WILLIAM J. BURGER and MAX E. LANGE, citizens of the United States, and residents, respectively, of East Cleveland, in the county of Cuyahoga and State of Ohio, and Cleveland, in the county of Cuyahoga and State of Ohio, have invented a certain new and useful Improvement in Tool or Work Holding Devices, of which the following is a full, clear, and exact description.

There are numerous specific varieties of tool holding devices for operatively connecting taps or dies to the turret of a turret lathe or to other machines in such position that the work may engage and be threaded by said tap or die. All of such tool holders which have any practical value have a peculiar mode of action; that is to say, the tool holder is held against rotation while the thread is being cut upon the rotating work; but automatically acquires the capacity to, and does rotate with the work for a brief period after the thread has been completed; and then automatically ceases to rotate as the work is being backed off as the result of rotating the work in the reverse direction.

So far as we are aware, all of the heretofore known tool holders having the above described characteristic mode of operation have been complicated and expensive, and are very liable to be broken or to get out of order.

The object of this invention is to provide a tool holder of the class specified, which is better than those heretofore known, because it is made up of less number of stronger and less expensive parts which are not liable to break or get out of order, and which may be easily and quickly assembled and disassembled, and which may be easily adapted to cut right or left threads as desired.

The invention consists in the construction and combination of parts shown in the drawing and hereinafter described and pointed out definitely in the appended claims.

In the drawings, Figure 1 is a side elevation partly in diametrical section of the invention on line 1—1 of Fig. 2; Fig. 2 is a transverse section on line 2—2 on Fig. 1; Fig. 3 is a detached perspective view of the removable plate 37. Fig. 4 is a view of the inner face of said plate; and Fig. 5 is a sectional view of said plate in the plane of line 5—5 on Fig. 4.

The tool holder comprises the tool holding hood 10; the shank 20, by means of which the tool holder is secured to the turret lathe; and ratchet and pawl mechanism by which the hood and shank are automatically connected or disconnected in order that they may act in the manner above set forth.

The hood 10 has in its front end a recess 12 for the reception of a part of the tool, *i. e.*, a tap or die; and set screws 13 may be employed for holding the tool in that recess. In the rear end of the hood is a cylindrical recess 14.

The shank 20 is provided with an enlarged cylindrical head 21 on its front end and this is rotatably fitted in said recess 14, and is capable of a limited endwise movement therein. An annular disk 15 is secured over the rear end of the bore 14 and limits this movement, and prevents the endwise withdrawal of the head out of the recess.

In the wall of the recess 14 is a ratchet depression which extends circumferentially a short distance, the sides of said recess being in the form of substantially radial shoulders 32, 33, which act as ratchet faces for engaging with the pawl.

In the head 21 is a diametrical recess 22 which extends from one side wall past the center. A plunger pawl 40 is slidably fitted therein; and it is associated with a spring 23 which acts to yieldingly force said pawl outward away from the axis of the head and into contact with the cylindrical wall of the recess 14. The turning of this plunger pawl upon its own axis in the head is prevented by the engagement of a pin 24, carried by the head in a slot 41 in the pawl. There are, in fact, two of these slots 41 placed 180° apart, in order to permit the position of the pawl to be reversed and to hold it against rotation in either position.

The outer end of the plunger pawl is formed with a tooth 42, and this tooth has two ratchet engaging shoulders or faces 43, 44. The shoulder 44 extends to the outer end of the tooth; but the shoulder 43 does not. A bevel surface 45 extends from the outer end of the shoulder 43 to the outer end of the tooth. The shoulder 43 which does not extend to the end of the tooth is, however, of such length that, when the end of the pawl tooth is in the bottom of the ratchet depression this shoulder 43 may engage the side wall or ratchet face 32 of the ratchet recess. This is the position of the parts when a right hand thread is being cut, and when the parts are in this position relative rotation of the hood and the shank is prevented.

The other pawl face or shoulder 44 faces the other shoulder 33 of the ratchet depression; and these engage with each other when the work is being unscrewed from the tool. Regardless of the position of the pawl, the face 44 thereon is always in such position that it may engage the shoulder 33. The rear end of the pawl tooth is in the form of a bevel surface 46. At the rear end of the ratchet depression is a rearwardly extended groove 35; and between this groove and the ratchet depression there is a beveled surface 36 which is opposed to and is complementary to the bevel surface 46 on the pawl tooth.

When a thread is being cut on the work in a turret lathe, the turret slide of the lathe is moved forward at a rate corresponding with the lead of the thread; and the back pressure of the work on the tool keeps the hood as far back on the spindle as it will go, as shown in Fig. 1. As the thread is being cut on the rotating work the short side 43 of the tooth engages with the opposed side wall 32 of the ratchet recess, and thereby the rotation of the hood relative to the shank is prevented. When the thread has been substantially completed the advance of the turret slide of the turret lathe or other holding device, is stopped by mechanism which is characteristic of such turret lathes or other machines.

It is not, however, practically possible to, at that same instant, stop the rotation of the work. It sometimes continues to rotate, and the tool continues to cut a thread upon it. As it does this, however, the tool holding hood is necessarily pulled forward. During this forward movement, which is not large, the two beveled surfaces 36 and 46 on the hood and pawl tooth engage, and this engagement causes such a retracting movement of the pawl as will withdraw the short side 43 of the tooth out of engagement with the side wall 32 of the ratchet recess. Thereafter, so long as the work continues to rotate, the pawl face 43 will not operatively engage the ratchet shoulder 32.

When this has been done the hood will rotate with the work so long as the work rotates; and therefore the thread cutting operation will cease. As the hood does so rotate the edge 32 of the ratchet recess will engage the beveled end surface 45 of the pawl tooth, and retract it entirely out of the ratchet depression, wherefore the end of the pawl will ride on the cylindrical inner surface of the recess 14. But when the work reverses its rotation, the hood will turn backward with the work until the pawl tooth comes opposite the ratchet recess 31, whereupon the pawl will fly outward far enough to allow the long side 44 of the pawl tooth to engage the side wall 33 of the ratchet recess, with the result that further rotation of the hood relative to the shank is prevented.

This engagement of the pawl tooth with the ratchet recess wall 33 takes place although there has been no rearward endwise movement of the hood on the shank. But when the work has been completely unscrewed from the tool, the hood is freed from restraint and is allowed to move backward, and it is automatically so moved by the reaction of the two beveled surfaces 36, 46, upon one another produced by the spring 23. When by this endwise movement of the head upon the shank the parts have been restored to their normal position, the pawl will have resumed the position shown in Figs. 1 and 2, in which it will, when the thread cutting operation is again begun, prevent the hood from rotating upon the shank.

As a refinement of the above described mechanism the ratchet recess 31 and the associated shoulders and beveled surfaces are formed in a plate 37 which is removably fitted in a recess in the wall of the recess 14 of the hood, there being a dovetail connection between the sides of this plate and the sides of this recess. There is in addition to the rearwardly extended groove 35 a corresponding forwardly extended groove 38; and the end of this groove is joined to said ratchet recess by a bevel surface 39 similar to the bevel surface 36.

The advantages of employing this removable plate constructed as described are as follows: Substantially all of the wear incident to using the described tool holding device is borne by the parts immediately adjacent the ratchet depression. If these become too much worn to function properly, the entire hood does not have to be thrown away. One may take out the plate 37 and reverse it; and thereupon the bevel surface 39 serves the same purpose which was served previously by the beveled surface 36. When both ends of this plate have been worn so that they do not properly function a new plate may be substituted.

To adapt the tool holder described for cutting either right or left handed threads the pawl is made reversible by means of the two slots 41. If, for example, the device is assembled to coöperate in the cutting of right handed threads and it was desired to cut left handed threads one had only to remove the pawl and reverse its position, that is, turn it 180° and then put it back so that the pin 24 will now engage in the other slot 41. If this is done the shoulder 33 will be engaged by the pawl face 43 during the thread cutting operation.

It will be clear to those familiar with this art that although a device of this kind is generally used to hold a thread cutting tool, and is generally attached to a nonrotating part of a machine,—(in which event the work piece to be threaded will be attached to a rotatable spindle), as hereinbefore described at length, it is not at all necessary to use the described device in this precise manner. It is possible to secure the device to the rotating spindle of a machine, in which event the device will perform its function in the manner described, provided that, if the hood carries either the work piece to be threaded or the threading tool, the other of said pieces is fixed to a suitable nonrotating part of the machine.

The appended claims are intended to cover the combination of parts which they recite irrespective of the particular manner in which the device is used, and irrespective of whether it is specifically a tool holder or a work holder.

Having described our invention, we claim:—

1. A tool or work holding device, comprising, in combination, a shank, a tool or work holding hood or member which is rotatably mounted on or in said shank and is capable of limited endwise movement on or in said shank, one of said parts being provided with a ratchet recess both side walls of which may serve as pawl engaging teeth, and a spring actuated pawl movably mounted on the other of said two parts,—said pawl having a tooth whose opposite side walls are of different lengths and are disposed for engagement with opposite side walls of said ratchet recess, and means whereby an endwise movement of the hood on the shank will move the pawl far enough to disengage the short side of said tooth from the opposed side wall of the ratchet recess but not far enough to prevent the engagement of the long side of said tooth from the other side wall of said ratchet recess.

2. A tool or work holder comprising, in combination, a shank, a tool or work holding hood which is rotatively mounted on the shank and is capable of limited endwise movement thereon, and a spring actuated plunger pawl which is mounted for radial movement on one of the first mentioned two parts and has two faces for engagement with shoulders on the other part,—and said other part having shoulders for engagement with the two faces on the pawl, said faces and shoulders being so constructed and disposed that when the hood and shank are in their normal relative positions either face on the pawl may engage the associated shoulder, but when the pawl has been retracted one face only on the pawl may engage the associated shoulder, said pawl and the part by which it is not supported being formed with beveled surfaces which will functionally engage and retract the pawl when the hood is moved endwise upon the shank.

3. A tool or working holding device comprising, in combination, a shank, a tool or work holding hood which embraces and is rotatably mounted upon said shank and is capable of limited endwise movement thereon, one of said parts having a ratchet depression and a longitudinal groove leading therefrom, said depression and groove being joined by a beveled surface, a movable spring actuated plunger pawl which is movably mounted on the other of said two parts, and is formed with a tooth having one side shorter than the other side for engagement respectively with opposite side walls of said recess, and having a beveled rear end for coöperating with said beveled surface.

4. A tool or work holding device comprising, in combination, a shank, a tool or work holding hood which is rotatably mounted on said shank and is capable of limited endwise movement on said shank, said hood having an internal ratchet recess, both side walls of which may serve as pawl engaging teeth, a radially movable spring actuated plunger pawl which is mounted on the shank within the hood,—said pawl having at its outer end a tooth whose opposite side walls extend different distances away from the axis of the device, and means whereby an endwise movement of the hood on the shank withdraws the plunger pawl, toward the axis of the device so far that the short side of the pawl tooth can not engage the opposed side wall of the ratchet recess.

5. A tool or work holding device, comprising, in combination, a shank having an enlarged head, a tool or work holding hood which embraces and is rotatably mounted upon said head, and is capable of limited endwise movement thereon, said hood having an internal ratchet depression and a groove leading therefrom rearward, said depression and groove being joined by a beveled surface, a radially movable spring actuated plunger pawl mounted in said head and formed with a tooth having one side shorter than the other side and having a beveled rear end for coöperating with the beveled surface on the hood and a beveled surface extending from the short side of said tooth to the end of the tooth.

6. A tool or work holding device, comprising, in combination, a shank, a tool or work holding hood which embraces and is rotatably mounted upon said shank and is capable of limited endwise movement thereon,—said hood having an internal ratchet depression and a groove leading therefrom rearward, and said depression and groove being joined by a beveled surface, a radially movable spring actuated cylindrical plunger pawl mounted in said head and formed with a tooth having one side shorter than the other side and having a beveled rear end for coöperating with the beveled surface on the hood, and means to prevent the rotation of the plunger pawl.

7. A tool or work holding device, comprising, in combination, a shank, a tool or work holding hood which embraces and is rotatably mounted upon said shank and is capable of limited endwise movement thereon, said hood having an internal ratchet depression, and a groove leading therefrom rearward, there being a bevel surface joining said depression and groove, a radially movable spring actuated cylindrical plunger pawl mounted in said shank and formed with a tooth having one side shorter than the other side and having a beveled rear end for coöperating with the beveled surface on the hood,—said plunger having two diametrically opposed grooves, and a pin carried by said hood for engagement in either groove to prevent the rotation of the plunger.

8. A tool or work holding device comprising, in combination, a shank, a tool or work holding hood which embraces and is rotatably mounted upon said shank, and is capable of limited endwise movement thereon, a plate removably secured within said hood,—which plate is formed with a ratchet recess and a groove leading therefrom rearward and a bevel surface joining said recess and groove, a radially movable spring actuated plunger pawl mounted in said head and formed with a tooth having one side shorter than the other and having a beveled rear end for coöperation with the beveled surface on said plate.

9. A tool or work holding device, comprising, in combination, a shank, a tool or work holding hood which embraces and is rotatably mounted upon said shank, and is capable of limited endwise movement thereon, a plate which is removably secured in said hood and is formed with a ratchet recess and shallow grooves leading in both directions from said recess and beveled surfaces joining said recess and grooves, a radially movable spring actuated plunger pawl mounted in said shank and formed with a tooth having one side shorter than the other and having a beveled rear end for coöperation with the beveled surface on said plate.

10. A tool or work holder, comprising, in combination, a shank, a tool or work holding hood which embraces the end of said shank and is rotatable and longitudinally movable thereon, a spring actuated radially movable plunger pawl mounted on the shank within the hood, said plunger and hood having beveled surfaces which when the hood moves endwise relative to the shank will engage and cause the retraction of the plunger pawl,—the hood having two oppositely disposed pawl engaging shoulders,—and the pawl having two oppositely disposed faces for engaging said shoulders, said shoulders and surfaces being so disposed that when the pawl is retracted one only of the surfaces on the pawl will be in position to engage a shoulder on the hood, and when the pawl is not retracted both faces on the pawl will be in position to engage shoulders on the hood.

In testimony whereof we hereunto affix our signatures.

WILLIAM J. BURGER.
MAX E. LANGE.